US011494812B2

(12) United States Patent
Ross et al.

(10) Patent No.: US 11,494,812 B2
(45) Date of Patent: *Nov. 8, 2022

(54) VIDEO AUGMENTATION WITH DYNAMIC WEB CONTENT

(71) Applicant: CONTENT DIRECTIONS, INC. DBA LINKSTORM, New York, NY (US)

(72) Inventors: Timothy Donald Ross, West Hartford, CT (US); Christopher Schacht, New York, NY (US); David Sidman, Brooklyn, NY (US)

(73) Assignee: CONTENT DIRECTIONS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/399,903

(22) Filed: Aug. 11, 2021

(65) Prior Publication Data
US 2022/0156802 A1 May 19, 2022

Related U.S. Application Data

(63) Continuation of application No. 16/953,096, filed on Nov. 19, 2020, now Pat. No. 11,430,019.

(51) Int. Cl.
*G06Q 30/02* (2012.01)
*G06F 16/958* (2019.01)
*G06F 16/953* (2019.01)

(52) U.S. Cl.
CPC ....... *G06Q 30/0277* (2013.01); *G06F 16/953* (2019.01); *G06F 16/986* (2019.01)

(58) Field of Classification Search
None
See application file for complete search history.

(56) References Cited

U.S. PATENT DOCUMENTS

| 2010/0169175 | A1* | 7/2010 | Koran | G06F 16/9535 |
| | | | | 705/14.45 |
| 2010/0293221 | A1* | 11/2010 | Sidman | G06Q 30/0273 |
| | | | | 709/203 |
| 2014/0229271 | A1* | 8/2014 | Clapp | G06Q 30/0245 |
| | | | | 705/14.44 |

(Continued)

OTHER PUBLICATIONS

Percival, John. HTML5 advertising. Apress, 2013 (Year: 2013).*

*Primary Examiner* — Christopher B Tokarczyk
(74) *Attorney, Agent, or Firm* — Weitzman Law Offices, LLC

(57) ABSTRACT

A system and method for augmenting video displayed via web browser to add interactive functionality is disclosed. Elements are included in a structured media definition to cause the video player to instantiate one or more new elements on a webpage when the media is played, including a first script that includes instructions to generate an interactive menu and second script, such that selection of any option from the interactive menu will call one or more application programming interface (API) functions of the second script. The structured media definition is transmitted to the web browser to cause loading of the video and execution of the instructions. A server backend receives and processes the API calls from the second script and transmits responses to the API calls to be acted upon by the script.

20 Claims, 13 Drawing Sheets

(56) References Cited

U.S. PATENT DOCUMENTS

| | | |
|---|---|---|
| 2014/0325030 A1 | 10/2014 | Maharajh et al. |
| 2015/0249872 A1* | 9/2015 | Lee ........................ G06Q 30/06 725/32 |
| 2016/0088369 A1 | 3/2016 | Terpe |
| 2017/0194030 A1 | 7/2017 | Doherty et al. |
| 2018/0295424 A1* | 10/2018 | Taylor ................ H04N 21/4312 |
| 2020/0285376 A1 | 9/2020 | Sidman |

* cited by examiner

VIDEO AUGMENTATION WITH DYNAMIC WEB CONTENT

CROSS-REFERENCE TO RELATED APPLICATION

This application is a continuation of co-pending U.S. application Ser. No. 16/953,096, filed Nov. 19, 2020, which is hereby incorporated by reference in its entirety.

FIELD OF INVENTION

The presently described innovations address systems and methods for augmenting video content embedded in a webpage to add executable code, including code for creating interactive user interfaces with cross-domain communication capabilities.

BACKGROUND

In virtually all communications media before the $21^{st}$ century, such as television, radio, and printed text, there are significant limits. A broadcast or publication is the same for all recipients, is viewed or heard passively by the recipient, is limited to one-way communication and requires use of another medium to respond to the broadcast or publication, and provides no confirmation that the recipient has viewed or heard the broadcast or publication. Traditionally, even with the sophisticated features and two-way communication made possible by computer networks, a communicator is limited to knowing that the recipient of the communication has received the communication, and perhaps that a certain portion of a video, such as the first, second, and third quartiles of the video, have been shown to the recipient. No reporting exists for confirming that a recipient paid attention to the video, nor has there been any way to confirm that any subsequent action by the recipient was connected to the recipient viewing the video, unless the recipient happens to click, tap, or otherwise interact with the video or user interface elements associated with the video.

The Interactive Advertising Bureau (IAB) has promulgated several de facto industry standards to facilitate the distribution of video content on the Internet. Two such standards are VAST (Video Advertisement Serving Template) and VPAID (Video Player Advertisement-Serving Interface Definition), which were preceded by a standard for mobile application advertisements, MRAID (Mobile Rich Media Advertisement Interface Definition). The IAB's intention is to combine all of these standards into a new standard. SIMID (Secure Interactive Media Interface Definition), which is intended to add security to the above standards as well as to consolidate and streamline them. These standards, when adopted by HTML5-based or other video playing software, allow a video to be defined to include additional features, including enabling external files to be loaded and executed by the video player.

Thus, there are advantages to a system that can display video content more directly linked with subsequent action by the recipient, and that captures and quantifies the recipient's self-expressed. "first-party" data (which is of higher quality and greater interest than conjecture by "second-party" persons or systems about what a recipient merely might be interested in), and that provide interactivity and facilitate cross-domain communication for more functional and engaging forms of video content.

BRIEF SUMMARY

The presently disclosed methods and systems take a video viewing experience to a much richer, deeper, more multi-faceted level by supplementing a primary video message with additional content reinforcing the message, such as an interactive menu or other user interface elements. This can include providing multiple additional videos that either replace or complement the primary video, so that a communicator is able to display many videos to a willing recipient instead of just the one.

Augmented video can encourage recipient engagement by not only playing a video delivering content that the communicator desires the recipient to see, but also providing a menu to browse other options or videos related to the primary video and to interact or communicate in response while still viewing that video. Supplementing a video with a truly interactive navigation menu transforms the recipient experience into a "lean-forward," actively-engaged recipient experience that renders the video significantly more useful and informative.

By using an easy-to-navigate, cascading menu format, the recipient can preview in advance all possible elements of the menu that they might be interested in, and then click, tap, or otherwise select just once to go directly to the specific product, information, transaction or other destination they desire. The interface can be adapted to match a website of the communicator such that it becomes like bringing the website to the person within the video.

Code included with the video and executed by the video player also allows the tracking of which branches of the menu the recipient explored, for how long (down to the precise moment), which videos they viewed and for how long, which menu items they viewed and/or clicked through, etc. This interaction data is not only extremely granular and precise, but it is also far more useful than conventional metrics because it documents what the recipient actually selected as a self-declared indication of interest and intent.

In one aspect of the disclosure, a system and method for augmenting video media to add interactive functionality when displayed on a webpage within a web browser are disclosed. The method performed by the system includes generating a structured media definition file that instructs a video player within the web browser to display a video, and including an element in the structured media definition file to cause the video player to execute a first script, such that execution of the first script instantiates one or more new HTML elements within the webpage when the video is played. The one or more new HTML elements include a second script that includes instructions to the web browser to generate an interactive menu, such that selection of an option from the interactive menu will call one or more functions of an application programming interface (API) via the second script. The structured media definition file is transmitted to the web browser for interpretation by the video player, thereby causing the video player to begin playing the video and to execute the first script. A server backend receives one or more API calls made via the second script as it is executed by the web browser based on an individual's interaction with the interactive menu. In response, the server backend transmits one or more responses to the one or more API calls to the web browser, such that the second script receives the one or more responses and additional instructions of the second script are executed after receiving the one or more responses.

This two-way communications cycle can be used to enable countless interactions that create value for communicators and their recipients alike, including dynamically changing the displayed video, dynamically updating a user interface, and enabling shopping, social networking, gaming, and other interactions, all from within the video.

BRIEF DESCRIPTION OF THE DRAWINGS

Other aspects, features and advantages will become more fully apparent from the following detailed description, the appended claims, and the accompanying drawings, provided solely for purposes of illustration without restricting the scope of any embodiment:

DETAILED DESCRIPTION

Figure 1A:
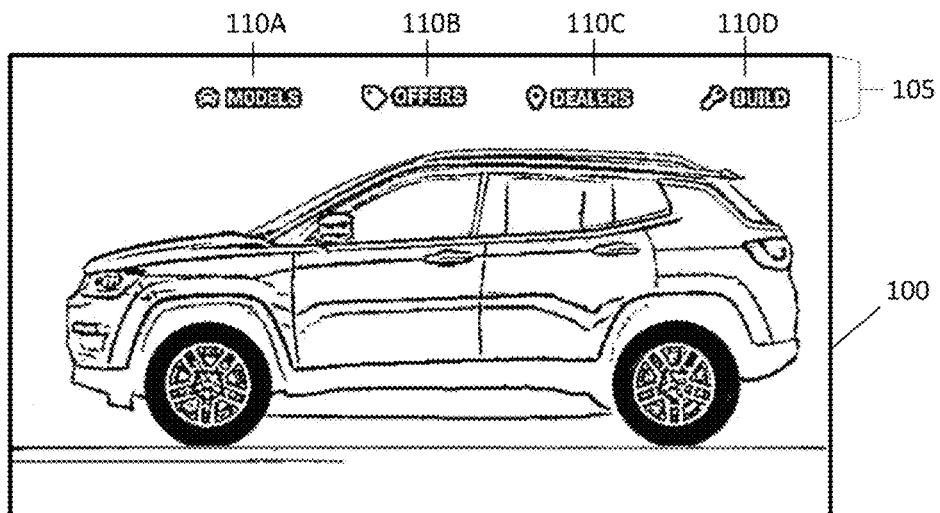
FIGS. 1A-1G depict several exemplary videos with different styles and functions of a multi-level menu.

In order to address the issues described above, methods and systems are provided to facilitate augmentation of a video by incorporating a script into the definition of the video, such that the script is executed by a native HTML5 video player or other video player, creating an interactive menu overlay or other user interface and allowing that interactive menu or interface to convey a variety of recipient input to a remote server and receive communications in response while a recipient views the video. A/B tests have shown that when recipients encounter interactive navigation menus within a video, they ultimately click the video and interact with a second website the video links to at vastly higher rates compared with videos that lack a navigation menu, even if the video is otherwise highly engaging or interactive. Prior A/B testing has shown that such videos performed up to 15× better in click-through rate and up to 7× better in subsequent interaction rate compared to non-interactive videos.

Throughout this written description, a number of particular industry standards are mentioned, and the preferred embodiment will use many of the most common technologies in use today for maximal interoperability with the systems that recipients use to access content and the videos that are injected into that content. However, many of the presently described features and functionalities can be adapted to other technological platforms or contexts without undue experimentation by a software developer. For example, although the HTML5 video player previously mentioned is preferred, other forms of deprecated standards for displaying content, such as Adobe Flash, QuickTime, etc., or future standards, such as HTML6 will be when it is eventually established, could be modified to work within the scheme presently described, albeit with less interoperability and support among modern web browsers. Other aspects of the written description focus on delivery of websites over the Internet via the HTTP protocol, but different networks (cable television, satellite networks, a local area network or ethernet, a wide area network, etc.), content (streaming video, e-books, online magazines, blogs, emails, social media posts, computer games, mobile apps, other software, or any other elements of individual or episodic content), or protocols (the QAM [quadrature amplitude modification] used in cable television, or other application-level content delivery protocols, such as FTP, IMAP, or XMPP) could be used to deliver augmented video to a recipient.

Further, although the preferred embodiment described is delivery of videos embedded within webpages for display on a computing device's web browser, completely different forms of content delivery may benefit from the same principles. For example, trailers or other commercials during television shows on cable television or before streaming a video on a television might be interacted with via a television remote control, and options selected either through pressing buttons on the remote, or through a voice command interface and a microphone of the remote control. Similarly, a video shown on a display may be navigated or controlled by a voice interface of an automated personal assistant device in the home, such as Amazon Echo's Alexa, Google Home, Apple's Siri, or a similar interface. Videos might even be delivered within a virtual reality (VR) headset and interacted with via hand movements that are picked up by a motion capturing accelerometer in a held controller, or by a motion capturing camera associated with the VR system. These and any other forms of human-machine interface may be used to select options, traverse a list of options, enter information or other inputs, and display outputs of the video to the recipient.

As an introduction to the core concepts discussed throughout the remainder of the written description, FIGS. 1A-1G depict several exemplary videos with different styles and functions of a multi-level menu.

Figure 1B:
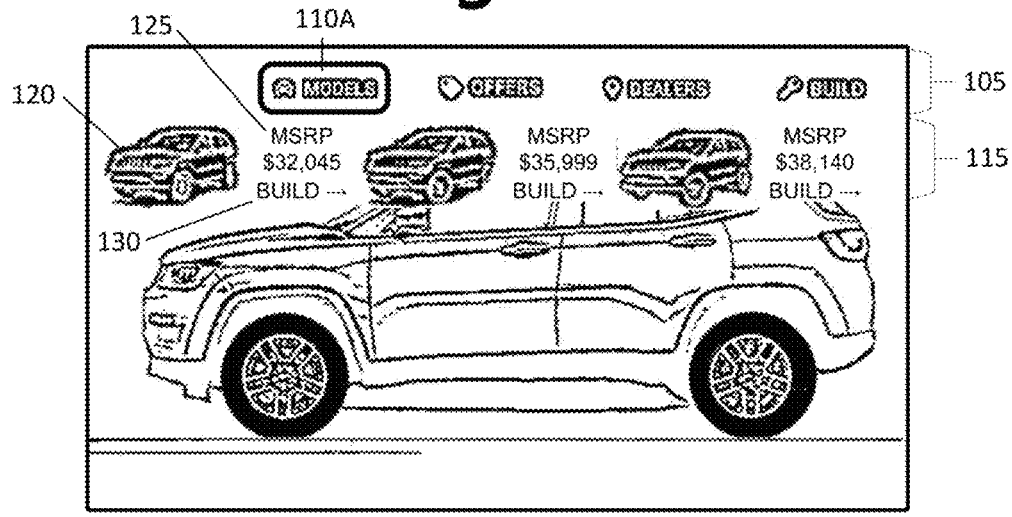
Figure 1C:
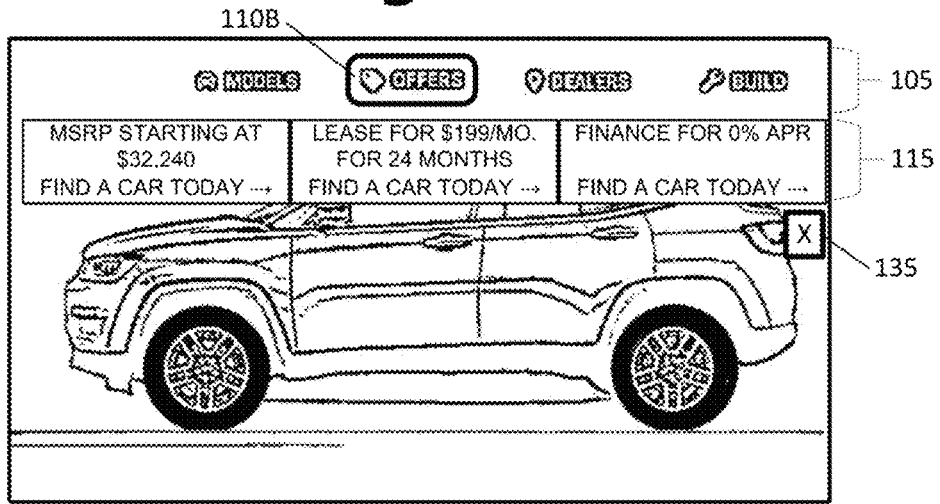

When a video 100 is first displayed to a recipient (as depicted in FIG. 1A), an interactive menu 105 is visible, overlaid on top of the video playing beneath it, the menu 105 containing multiple options or elements 110A-110D with which the recipient can interact. Upon clicking on or moussing over, or otherwise selecting one of the options 110A, a new submenu 115 may appear and be populated to include content related to the clicked element 110A (as depicted in FIG. 1B). This content may include images 120, text 125, or hyperlinks 130; in this case, images of vehicles for sale, information about the vehicles, and links that, when clicked, take the recipient to the seller's website to learn more and/or make a purchase. Upon interacting with a different element 110B, the submenu 115 is repopulated to include different content (as depicted in FIG. 1C). Clicking an "exit" button 135 can cause the submenu 115 to disappear and playback of the video continues while only displaying the menu 105.

Figure 1D:
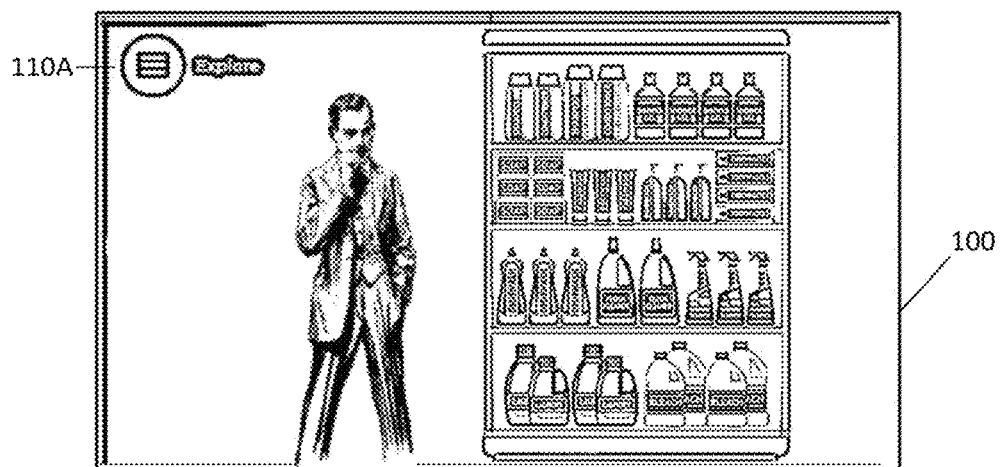
Figure 1E:
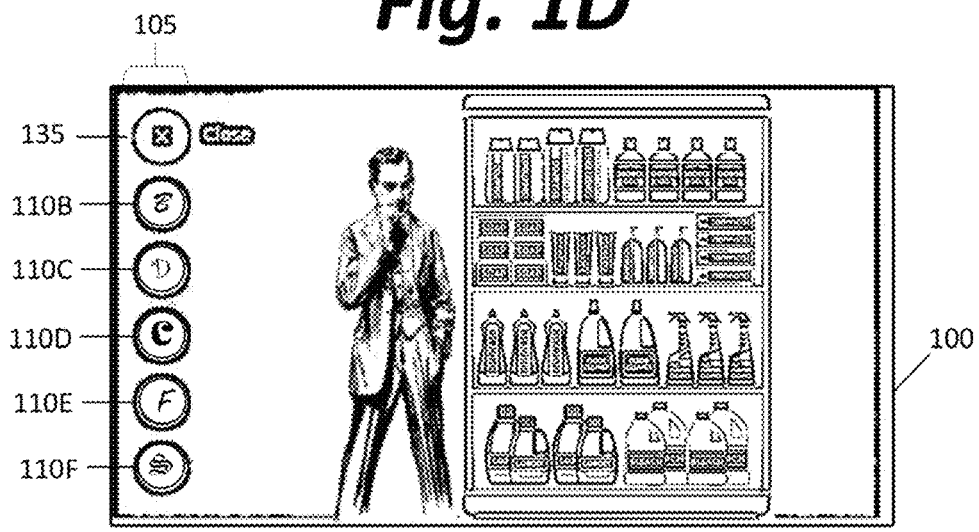
Figure 1F:
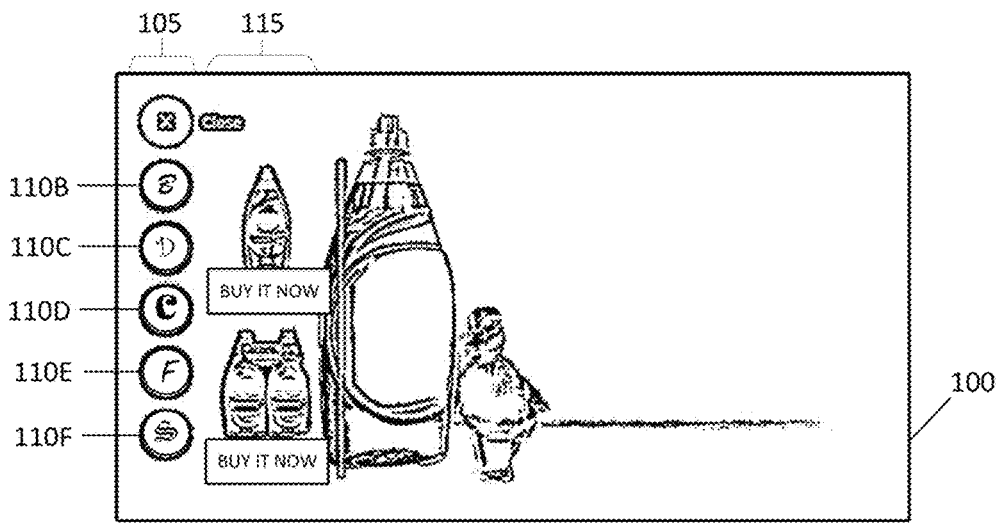

FIGS. 1D-1F depict a video 100 that exemplifies a "full-funnel" engagement strategy. When the video 100 first begins to play (as depicted in FIG. 1D), the video is not occluded by any interface elements except for an unobtrusive menu option 110A labeled "Explore". Even if the recipient never attempts to interact with the "Explore" button 110A, he or she will be exposed to a concept or brand being displayed, and the desired "upper" funnel effect will have been accomplished. Clicking or tapping the "Explore" button 110A causes the rest of the menu 105 to become visible (as depicted in FIG. 1E), further familiarizing the recipient with a number of brand options 110B-110F and potentially driving the recipient to investigate further and see what will happen if the recipient clicks or taps one of the options. The "Explore" button 110A is also replaced with a "Close" button 135 that can be clicked or tapped by the recipient to return to viewing the video alone. If the recipient selects a menu option 110C (as depicted in FIG. 1F), the video itself changes to a new video emphasizing the brand depicted in the menu option 110C, and the submenu 115 is populated with image prompts 120 accompanied by hyperlinks 130 allowing the recipient to immediately buy the products depicted. In this way, each stage of the funnel can drive recipient interest further along, and the recipient can proceed through the funnel as long as he or she is willing, even to the point of making a purchase, when perhaps at the time the video was first shown, the recipient was unaware of the options associated with the brand.

Figure 1G:
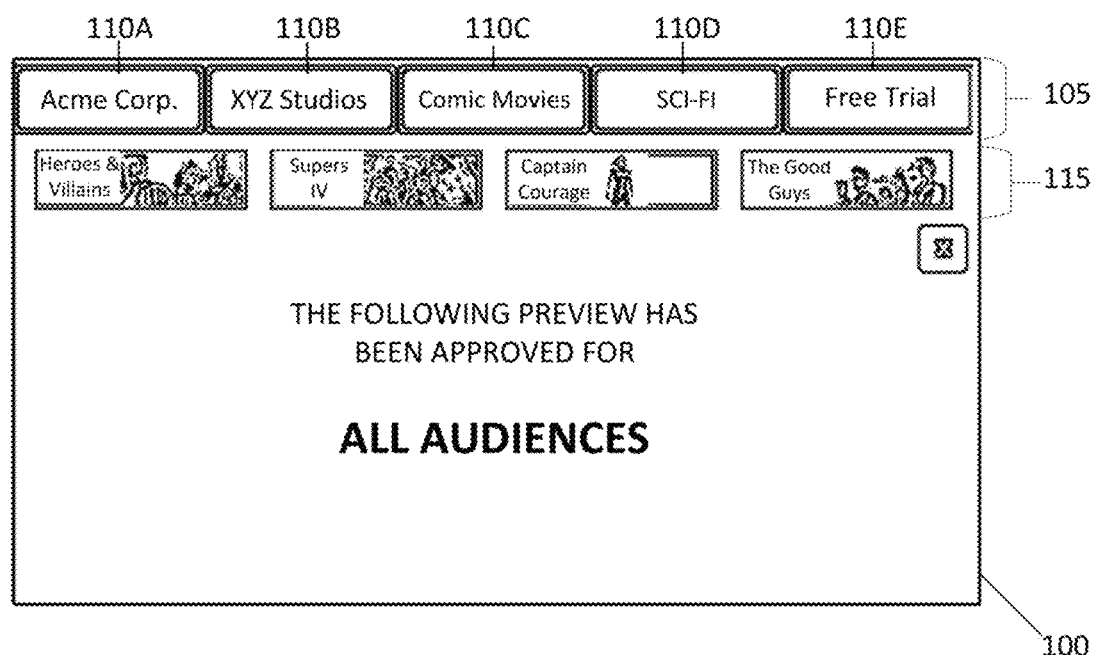

FIG. 1G depicts a video 100 where both the menu 105 and submenu 115 are filled with images of brand options 110A-110D and images representing particular options within each brand—in this case, studios or cinematic universes, and trailers for movies associated with each. Each time an option is selected from submenu 115, a new trailer begins playing within the main body of the video 100, allowing the recipient to view any or all of the trailers available. Unlike the interfaces in FIGS. 1A-1F, most menu options do not cause the recipient to navigate away from the video player, and instead merely exercise control over which video is playing. However, a final menu option 110E may be clicked or tapped to cause the recipient to be taken to an external webpage for signing up to a service or purchasing one or more goods.

Although the most commercially valuable embodiment of the present disclosure is a video advertisement, as shown in FIGS. 1A-1G, the technology described herein can also be used for video content that does not advertise a particular good or service nor propose a financial transaction. Any form of video media that conveys a message to an end recipient could be augmented. For example, various governmental, non-profit, or other organizations might equally benefit from interactive media content containing public service announcements, inclement weather warnings and alerts, solicitations for donations or charity, requests to sign petitions, and/or calls for public vigilance or action such as an Amber alert or a "Get Out the Vote" exhortation.

Figure 2:
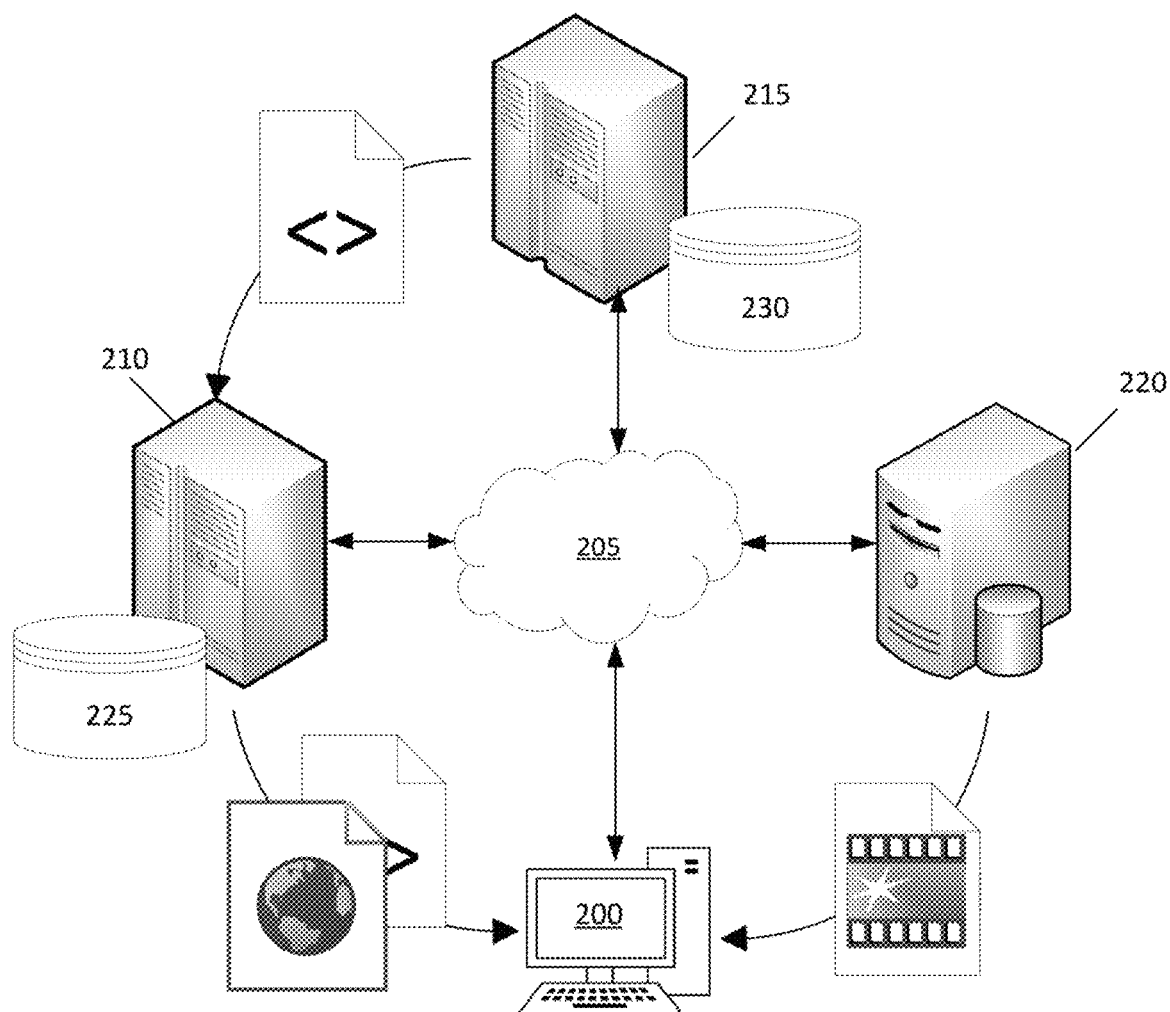
FIG. 2 depicts a network of representative computing devices to be used in a system for providing webpages that include interactive videos with two-way cross-domain communication capabilities.

FIG. 2 depicts a network of representative computing devices to be used in a system for providing webpages that include interactive videos with two-way cross-domain communication capabilities.

A recipient computing device 200 with software including a web browser is used to connect to the Internet 205 or another similar network for connecting various remote devices. The recipient computing device 200 may be a personal computer such as a laptop or desktop, a mobile phone, a tablet, a gaming console, or any other device capable of using a web browser to display a webpage to a recipient.

A web browser operating on the recipient computing device 200 is used to request or navigate to a URL at a particular domain provided by a web server 210. The webpage at that URL (depicted as element 300 in FIG. 3) incorporates instructions to the recipient's web browser, described further below in relation to FIG. 4, to load a video or other dynamic content supplied by a content server 220 that stores video content or other information that will be dynamically inserted at the moment that a video is loaded.

A management server 215 is used to distribute the information to generate videos and augmented content to the web server 210, as well as to provide an API for receiving communications from the recipient's computing device 200 once the recipient begins watching and interacting with the augmented video. The management server 215 may also provide a user interface for creating augmented videos, as depicted and described further below in relation to FIGS. 7A and 7B.

The servers 210 and 215 might conceivably store all necessary information to their functions locally on the servers themselves, but in a preferred embodiment, they will be communicatively coupled to a web server database 225 and a management database 230, respectively. The web server database 225 would not only store the content related to a website that a recipient might request, but also the specified definitions of augmented videos generated for embedding in that website, as described further in the discussion of the following Figures. The management database 230 would store information regarding all augmented videos generated using the user interface described in FIGS. 7A and 7B, as well as a log of recipient views of and interactions with videos already transmitted, as described further in relation to FIGS. 4-6, below.

Although a particular division of functions between devices is described in the system above, other configurations are possible in which functions are divided among devices differently. For example, any or all of the functions of the web server 210, the management server 215, the content server 220, and the databases 225 and 230 could theoretically be performed by a single device executing one or more different software modules simultaneously. Further, although the first web server 210, the management server 215, the content server 220, and the databases 225 and 230 are each described as if they are one computing device or database each, a cloud-based solution with multiple access points to similar systems that synchronize their data and that are all available as backups to one another is preferable to a unique set of computing devices all stored at one location. The specific number of computing devices and whether communication between them is network transmission between separate computing devices or accessing a local memory of a single computing device is not so important as the functionality that each part has in the overall scheme.

Figure 3:
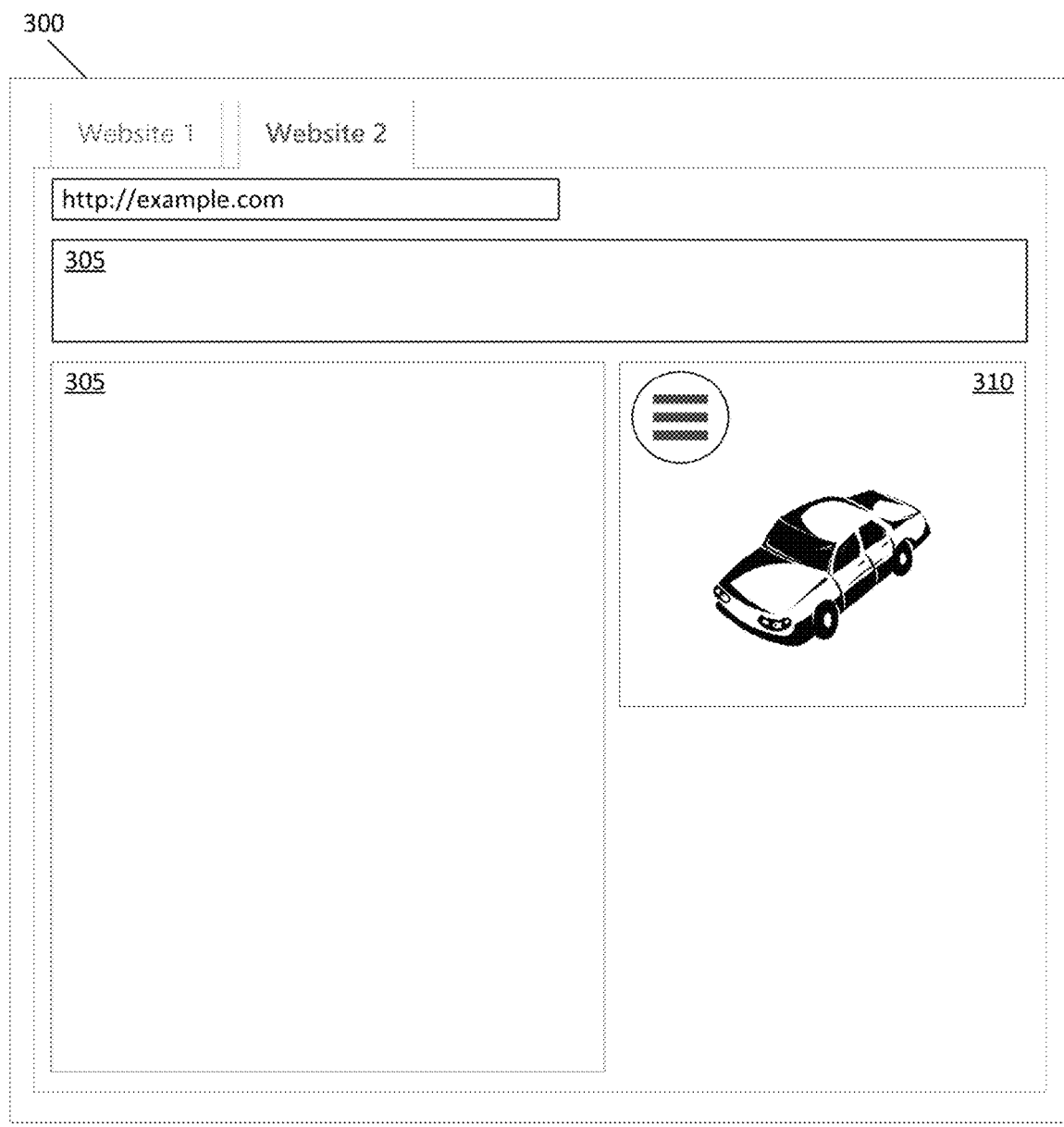
FIG. 3 depicts a representative web-based interface incorporating a video augmented with additional content.

FIG. 3 depicts a representative web-based interface incorporating a video augmented with additional content.

A webpage 300 may include multiple content regions 305 as well as a video region 310. In a preferred embodiment, an iFrame is created in the video region 310 and loads the video and any other elements within the iFrame such that the iFrame shields the video and its augmented content from the rest of the webpage 300's functionality, and any scripts running on the webpage 300. As a result, there will be no name collisions if a script running on the webpage 300 attempts to affect an element having a particular name or ID, or tries to affect elements of the webpage in general.

In some embodiments, the video region 310 will be limited to a banner or floating element to one side of the webpage, as depicted in FIG. 3. In other embodiments, a modal box or other element 310 may be created taking up all of or a significant portion of the webpage, such that the rest of the webpage 300 cannot be interacted with until the video has completed and then allows the recipient to progress to the rest of the webpage.

The video region 310 can also be adapted as part of a responsive design, using CSS, JavaScript, or other methods to dynamically resize the video region based on the dimensions available to a viewing device, the dimensions of a webpage incorporating the video, and/or the layout of the webpage incorporating the video.

Figure 4:
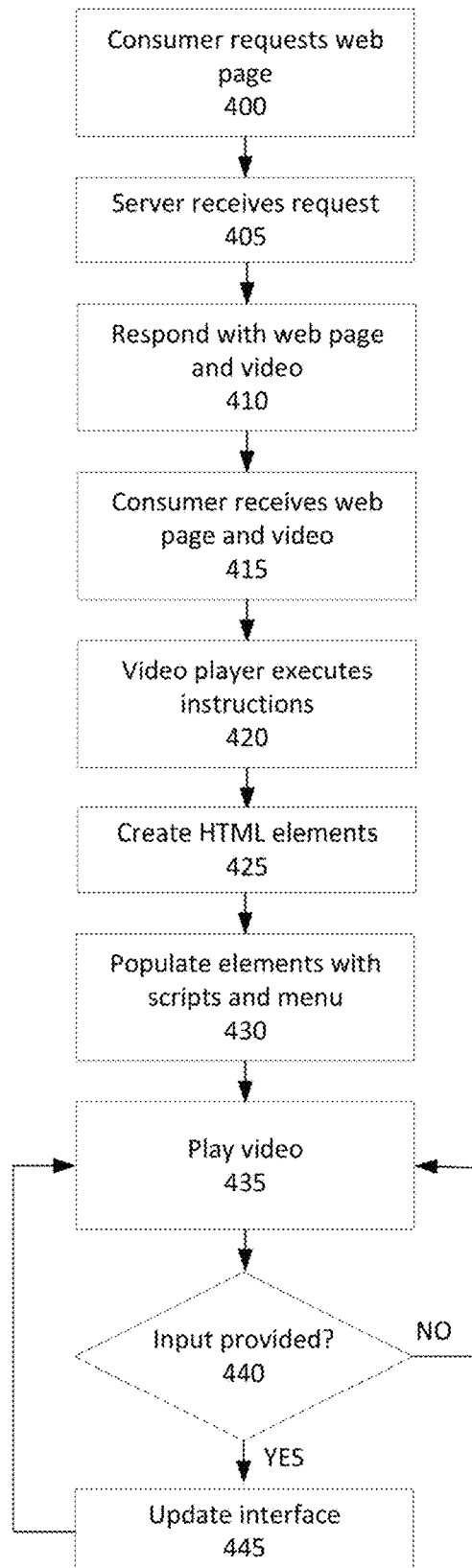
FIG. 4 depicts, in simplified form, a method of providing an augmented video to a recipient.

FIG. 4 depicts, in simplified form, a method of providing an augmented video to a recipient.

Initially, the recipient requests to view a webpage via their computing device 200 (Step 400), and the web server 210 receives the request (Step 405).

The web server 210 responds to the request with HTML data for the website, and further includes a VPAID-specified video with the response (Step 410). VPAID is an XML-based specification that includes a number of elements or tags relevant to displaying a video to a recipient, tracking the recipient's engagement with the video, and enabling inclusion of additional content such as JavaScript or other executable code. An example VPAID-specified video designed to work with the presently described systems and methods is provided below:

```
<VAST xmlns:xsi="http://www.w3.org/2001/XMLSchema-instance"
xsi:noNamespaceSchemaLocation="vast.xsd" version="3.0">
    <Ad id="1234567">
        <InLine>
            <AdSystem>Linkstorm</AdSystem>
            <AdTitle>Linear VPAID Example</AdTitle>
            <Description>Vpaid Linear Video Ad</Description>
<Error>https://listener.linkstorm.net/error/eyJJSUQiOiAiVlBBRF
9HTlJDX0QzNUQifQ==</Error>
<Impression>https://listener.linkstorm.net/impression/eyJJSUQi
OiAiVlBBRF9HTlJDX0QzNUQifQ==</Impression>
            <Creatives>
                <Creative sequence="1">
                    <Linear>
                        <Duration>00:00:30</Duration>
                        <TrackingEvents>
                            <Tracking
event="start">https://listener.linkstorm.net/start/eyJJSUQiOiA
iVlBBRF9HTlJDX0QzNUQifQ==</Tracking>
                            <Tracking
event="firstQuartile">https://listener.linkstorm.net/firstQuartile/
eyJJSUQiOiAiVlBBRF9HTlJDX0QzNUQifQ==</Tracking>
                            <Tracking
event="midpoint">https://listener.linkstorm.net/midpoint/eyJJS
UQiOiAiVlBBRF9HTlJDX0QzNUQifQ==</Tracking>
                            <Tracking
event="thirdQuartile">https://listener.linkstorm.net/thirdQuartile/
eyJJSUQiOiAiVlBBRF9HTlJDX0QzNUQifQ==</Tracking>
                            <Tracking
event="complete">https://listener.linkstorm.net/complete/eyJJS
UQiOiAiVlBBRF9HTlJDX0QzNUQifQ==</Tracking>
                            <Tracking
event="mute">https://listener.linkstorm.net/mute/eyJJSUQiOiAiV
lBBRF9HTlJDX0QzNUQifQ==</Tracking>
                            <Tracking
event="unmute">https://listener.linkstorm.net/unmute/eyJJSUQiO
iAiVlBBRF9HTlJDX0QzNUQifQ==</Tracking>
                            <Tracking
event="pause">https://listener.linkstorm.net./pause/eyJJSUQiOiA
iVlBBRF9HTlJDX0QzNUQifQ==</Tracking>
                            <Tracking
event="resume">https://listener.linkstorm.net/resume/eyJJSUQiO
iAiVlBBRF9HTlJDX0QzNUQifQ==</Tracking>
                        </TrackingEvents>
                        <AdParameters>
                        <! [CDATA(
                        {
                            "videos":[
                            {
"url":"https://cache.linkstorm.net/images/dsny/gnrc/
disneyplus_main.mp4?92363",
                                "mimetype":"video/mp4"
                            }
                            ],
                            "adDuration":"00:00:30",
                            "outstream":"false",
                            "adSkippableState":"false",
                            "controls":"false"
                        }
                        )]>
                        </AdParameters>
                        <VideoClicks>
                            <ClickTracking id="linkstorm">
<! [CDATA[https://listener.linkstorm.net/clicktracking/eyJJSUQi
OiAiVlBBRF9HTlJDX0QzNUQifQ==] ]>
                            </ClickTracking>
                        </VideoClicks>
                        <MediaFiles>
                            <MediaFile
                                id="3224257" height="304" width="540"
type="application/javascript"
                                delivery="progressive"
maintainAspectRatio="true" scalable="true"
apiFramework="VPAID">
https://serveit.linkstorm.net/sb/VPAD_GNRC_D35D/vpaid.js?IID=
VPAD_GNRC_D35D&74579
                            </MediaFile>
                        </MediaFiles>
                    </Linear>
                </Creative>
            </Creatives>
        </InLine>
    </Ad>
</VAST>
```

In alternative embodiments, specifications other than VPAID could be used. For example, in the future, video content will likely be specified according to SIMID rather than VPAID for security reasons, but SIMID is capable of the same dynamic loading process. Any form of definition that instructs a video player to load a series of instructions capable of modifying the contents of the webpage may be used instead, and VPAID will be subsequently used for the sake of convenience throughout this written description rather than clarifying in each instance that a more general form of definition could be used equally well.

In the code above, the XML element

```
"<MediaFile type="application/javascript"
apiFramework="VPAID">
https://serveit.linkstorm.net/sb/VPAD_GNRC_D35D/vpaid-
.js?IID=
VPAD_GNRC_D35D&74579 </MediaFile>"
``` will cause a video file to load a particular JavaScript file entitled "vpaid.js" and begin executing it while a video is playing.

The code above also includes tags such as "<Error>", "<Impression>", and "<TrackingEvents>" that each specify one or more possible events that can occur while a recipient is watching the video (i.e., failure to load and play the video, confirmation that the video has been displayed, and various temporal checkpoints or recipient actions while watching the video, respectively). In each case of the above example, the tag specifies a URL at the management server 215 to which an HTTP request will be transmitted if the event occurs. The URLs can serve as a RESTful (representational state transfer) API where each distinct HTTP request encodes in the URL itself the event that has occurred, the recipient who triggered the event, and any other relevant information. In other embodiments, another form of communication may be used either that does not rely on an HTTP request to a specific URL, or that is not a RESTful API, but nevertheless ensures that a message gets through to the management server 215.

This enables the management server 215 to store the events associated with the recipient, and react to them in several ways. The management server 215 may better target videos in the future based on which videos a recipient engages with for a longer period of time or that a recipient chooses to resume or unmute after having previously paused or muted the video. The events can also be used to recreate the recipient's experience (see the discussion of FIG. 8, further below) during a postmortem evaluation to understand the recipient's possible thought process while viewing the video, based on the actions taken by the recipient while watching.

The recipient's browser receives the webpage and the VPAID definition (Step 415), and, as called for by the webpage, instantiates an HTML5 video player or other video player to display the video. Code to accomplish the instantiation and that is capable of parsing and complying with the VPAID definition may be found in, for example, the Interactive Media Ads Software Development Kits provided by Google.

The HTML5 video player or other video player within the recipient's browser begins executing the VPAID instructions, including loading a video from the content server 220 and executing the JavaScript specified in the "<MediaFile>" tag of the VPAID instructions (Step 420).

The JavaScript includes instructions to create a new iFrame element in the HTML of the page (Step 425). As previously mentioned, an iFrame is preferred as a better method of protecting the contents from interference by other scripts that may be running on the page. Use of an iFrame can also enable cross-domain communication that might be blocked by security settings of a web browser if a script directing HTTP requests to the management server 215 were to apparently do so from a domain served by the web server 210. However, in other embodiments, a "<div>" or other HTML element capable of storing other HTML elements within it might be used instead.

The iFrame is then populated with user interface elements and JavaScript necessary to respond to recipient manipulation of those elements (Step 430). This may include, most obviously, the menu of the sort depicted in FIGS. 1A-1C. However, in alternative forms of video content, numerous other forms of interactive content might be included, such as:

filling out and submitting a form, including for purposes of registering a new user of a service, logging in as an existing user of a service, or providing contact information and consent to future communications such as a mailing list for coupons or special offers,
  browsing through a selection of additional content, documents, or other files and submitting a request to download one or more of these files,
  filling out a survey or voting in a poll, and viewing results of the survey or poll in real time,
  bidding in an online auction, viewing the current status of the auction, or otherwise browsing and participating in other interactive marketplaces with user-submitted content,
  viewing the status of a local or multiplayer game, and participating in the game by logging in, selecting options, and/or selecting moves or providing input to control one's character or one's assets within the game,
  entering information to be posted to one or more social media networks with which the recipient has an account, such as Facebook, Instagram, LinkedIn, etc., including textual content, image content, or "likes" or other interactions facilitated by those social networks, and viewing content submitted by others to social media networks.
  viewing or sending instant messages, texts/SMS, emails, or other forms of electronic communication,
  connecting to additional input devices of the recipient's computer 200, such as a microphone, camera, fingerprint reader,
  confirming of one's identity, providing a password, supplying a temporary or ad-hoc access code, uploading an identity-confirming token or file, or any other form of logging into a server or providing the second factor in a service's two-factor authentication,
  browsing or shopping within an online store, adding items to an online shopping cart, and/or providing payment and shipping information to check out and complete a purchase from within the video—a functionality described in other contexts in pending U.S. Pat. App. 63/081,157, filed Sep. 21, 2020 and titled "METHODS AND SYSTEMS FOR CROSS-DOMAIN TWO-WAY COMMUNICATION BY DYNAMIC WEB CONTENT", herein incorporated by reference in its entirety—and/or
  any other form of communications to or from the video, especially to facilitate dynamic retargeting and dynamic optimization, described more fully below.

The video player begins playing the video (Step 435), such that the recipient now sees both an underlying video playing and the persistent, interactive menu (or other functionality, as described in the paragraph above) that can be browsed while the underlying video plays.

If the recipient at any point provides input (Step 440), such as by clicking one of the menu options 110, the JavaScript running in the iFrame updates the menu or other user interface elements accordingly (Step 445), by populating a submenu with options, displaying a different video, displaying a confirmation that an event has been recorded on a different website (such as an indication that a shopping cart now contains items, or a confirmation that a new username has been created), or any other reaction to the user's input. In any event, the video continues playing (back to Step 435) until it is either paused or closed by the recipient, it finishes playing and self-closes if that behavior is desired, or the video is replaced with another dynamically loaded video in response to recipient input.

Figure 5:
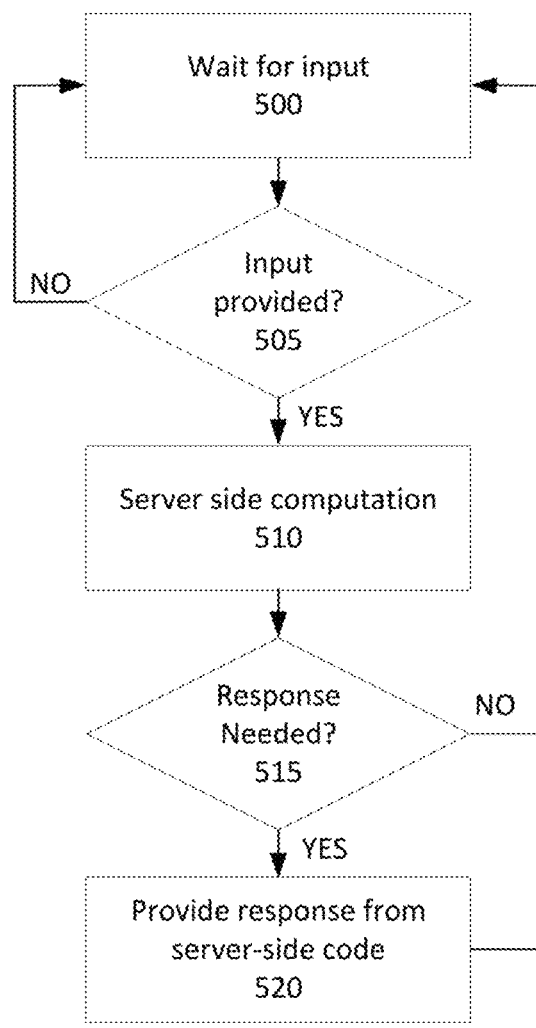
FIG. 5 depicts, in simplified form, a method of receiving communications from an augmented video to update a profile or cart associated with a recipient.

FIG. 5 depicts, in simplified form, a method of receiving communications from an augmented video to update a profile or cart associated with a recipient.

Initially, the server passively waits for input (Step 500) in the form of an HTTP request to a particular predefined URL that specifies a particular video and a particular event or action associated with that video.

If input is provided via the URL API previously described (Step 505), then various actions may take place on the server side (Step 510). Inputs may include active recipient decisions such as clicks, taps, or other indicators of recipient intent, but may also include other information such as the total view time of a particular menu element before the recipient passed on to a different user interface element. An augmented VPAID video is thus able to track every second of viewing, clicks within each menu, and time spent on each branch of the menu—not only statistics at the quartile level, as previous, non-augmented VPAID videos were limited to.

If the input demands a response (Step 515), then the management server 215 will transmit an appropriate response (Step 520). A response might include a mere acknowledgement, or more detailed instructions to update an aspect of the user interface, such as loading new menu elements, prompting a recipient to login to a third-party website or single sign-on system, showing that an item has been added to a shopping cart, etc.

Once action has been undertaken and a response has been provided, the system returns to waiting for input (Step 500) in a cycle so long as the server is running and expecting possible input related to videos.

Figure 6A:
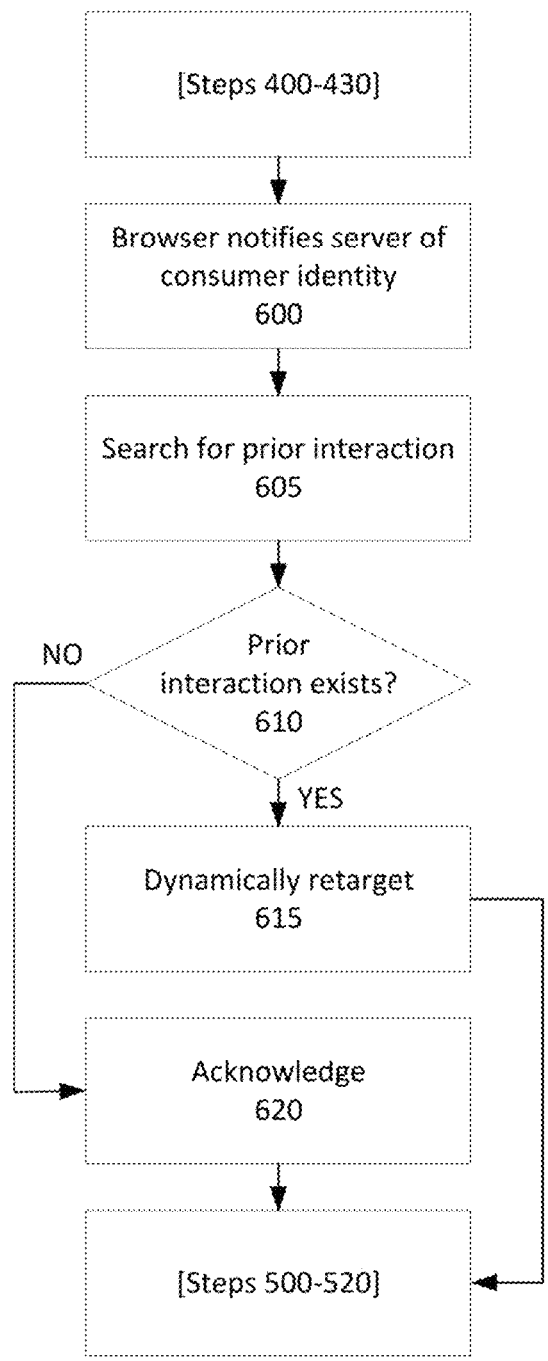
FIG. 6A depicts, in simplified form, a method of dynamically retargeting video content based on a recipient's previous inputs or engagement with the video or a similar video.

FIG. 6A depicts, in simplified form, a method of dynamically retargeting a video based on a recipient's previous inputs or engagement with the video or a similar video.

When a video is viewed for a second time, Steps 400-430, as depicted in FIG. 4, repeat as before from the recipient's point of view.

A JavaScript call to the server 215 notifies the management server 215 of the identity of the recipient (or provides information that was stored in cookies, a tracking pixel, or other tracking assets associated with the web browser of the recipient) that has been detected (Step 600).

Next, the management server 215 looks up in its local storage or an associated database that video and that recipient (Step 605) to review any events that were previously captured when the recipient viewed the video the first time.

Upon determining that the recipient had interacted with the video (Step 610), the management server 215 transmits instructions to dynamically retarget an aspect of the user interface or video (for example, show a different video, or go down a menu branch) (Step 615).

In some embodiments, this dynamically retargeted aspect may be as simple as automatically returning the video and its user interface to a state in which the recipient had previously left it, such as automatically opening a menu branch that the user had previously opened, or automatically displaying a secondary video that the recipient had caused to be displayed instead of the primary video.

In other embodiments, other data, including third party data associated with the recipient, may be consulted. For example, the management server 215 may access information documenting which products the recipient has viewed on another website, then pull information from a product database the content describing those products (typically based on the products' unique identifiers such as SKUs or UPCs or ISBNs), including product names, images, prices, categories, etc., and then place that content within the interactive menu that is served to the recipient, so that the recipient is presented with the products they had previously expressed an interest in. The menu may also have a new menu branch for "Recently Viewed" items which then expands to show all products that had been viewed by the recipient and direct the recipient's attention to the most likely items for the recipient to engage with.

Other applications may include, for example, a video about for online dating services being customized to show the profiles and/or photos of potential dating candidates the recipient had been considering; a video about travel services being customized to show the destinations the recipient had been exploring; a video about an online music service being customized to include references or even audio clips of music recordings that the recipient had searched for or browsed on the site, or from music artists the recipient had searched or browsed; a video about a source of medical information or equipment being customized to show references to diseases, symptoms or medicines as driven by the recipient's previous searches; or a video about an aggregator of medical or legal or other services being customized to show service providers that the recipient had viewed or other service providers in the same field.

Other forms of optimizing video content may include a recipient viewing tourism information being shown hotels or travel packages for those locations, even if the recipient had not specifically viewed those hotels or travel packages; a recipient whose location had been determined via a geolocation mechanism being shown a video customized to display restaurants or stores or offices or bank branches near their location, even if the recipient had not specifically seen those entities online; other optimizations based on the combination of the recipient's location with other online or offline data about that recipient; or any other customization based on location-related data, demographic data, credit card purchase data, or any other source of data that could be used as a basis for targeting individuals with augmented video content relevant to those individuals.

If, instead, there are no relevant prior events to consider related to the recipient, the server will acknowledge the transmission without additional instructions (Step 620).

In either event, the management server 215 then waits for additional input (returning to and repeating Steps 500-520).

Figure 6B:
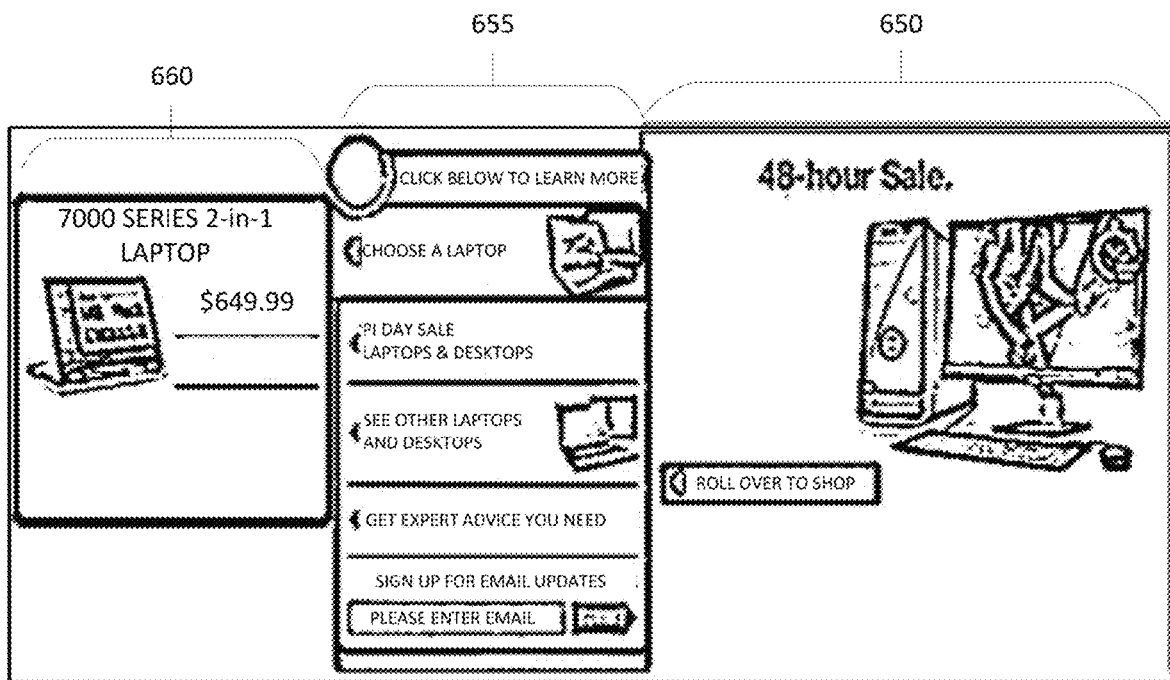
FIGS. 6B and 6C depict an example of dynamically retargeted video content before and after retargeting, respectively.
Figure 6C:
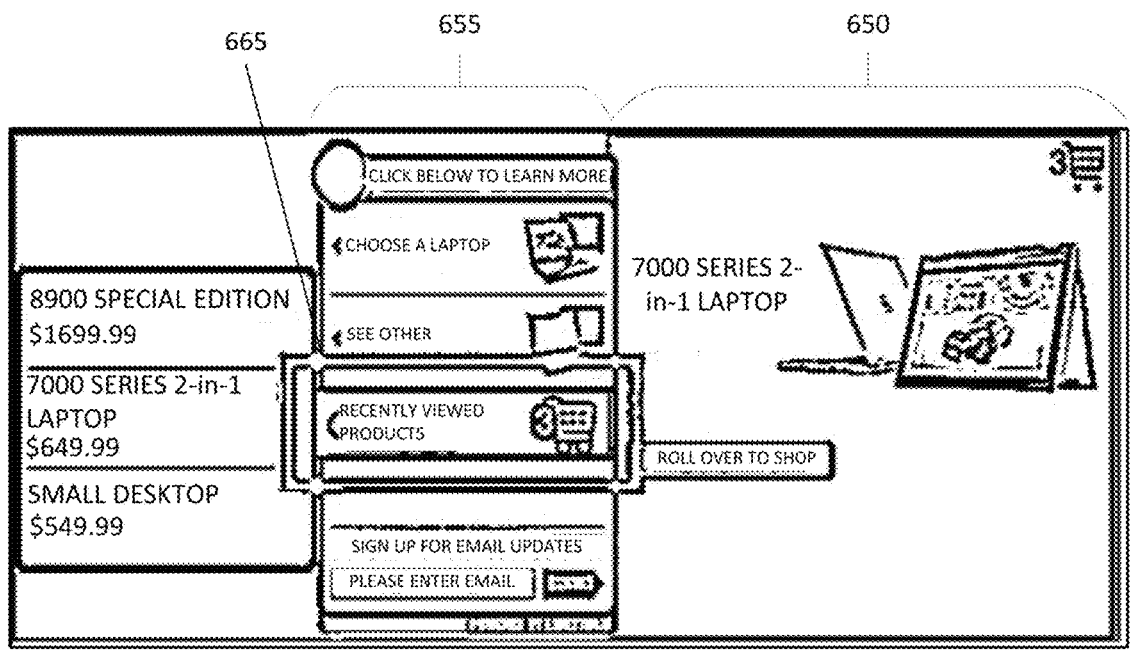

FIGS. 6B and 6C depict an example of dynamically retargeted video content before and after retargeting, respectively.

The first time a video 650 is displayed (as in FIG. 6B), the video is generically supporting a particular brand according to the "full funnel" concept, and the recipient is encouraged to browse a menu 655, moving down the hierarchy into a submenu 660 with a particular model. The recipient's clicking or tapping to arrive at the submenu 660 is recorded at the management server even though the recipient never makes the purchase of that particular model.

However, the second time the video 650 is displayed (as in FIG. 6C), there are several distinct changes. First, the main content of the video 650 is different; no longer is a "full funnel" strategy being pursued for this video viewing, because it is already known that the recipient is familiar with and at least curious about the brand and at least one model within that brand. The main content of the video is centered on the particular model known to have caught the recipient's eye in the past. The menu 655 now adds a "Recently Viewed" option 665, and its contents are dynamically loaded with items that the recipient has viewed either in past iterations of the video, or that the recipient had viewed on another website directly, with that information being provided via either a direct channel from the website, or via cookies or other tracking markers stored on the recipient's web browser. The video is thus hyper-targeted, focusing first on a model that the recipient has previously investigated, second on recently viewed other items of interest, and only third on other items for which there is less data to gauge the recipient's interest. The higher density of interesting offers to the recipient is likely to drive a much higher rate of click-through, even compared to an interactive but non-targeted video.

Figure 7A:
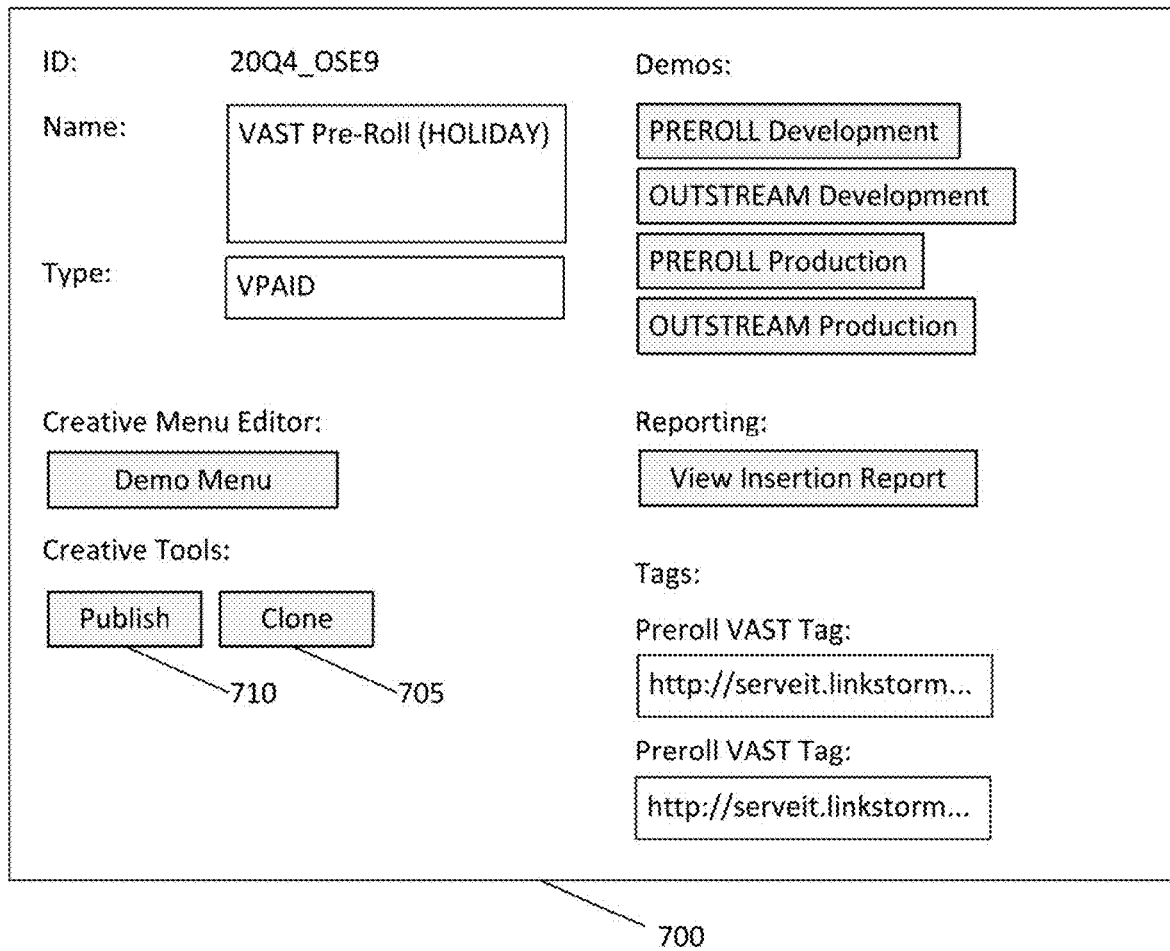
FIGS. 7A and 7B depict a user interface for defining interactive menus to be associated with a given video.
Figure 7B:
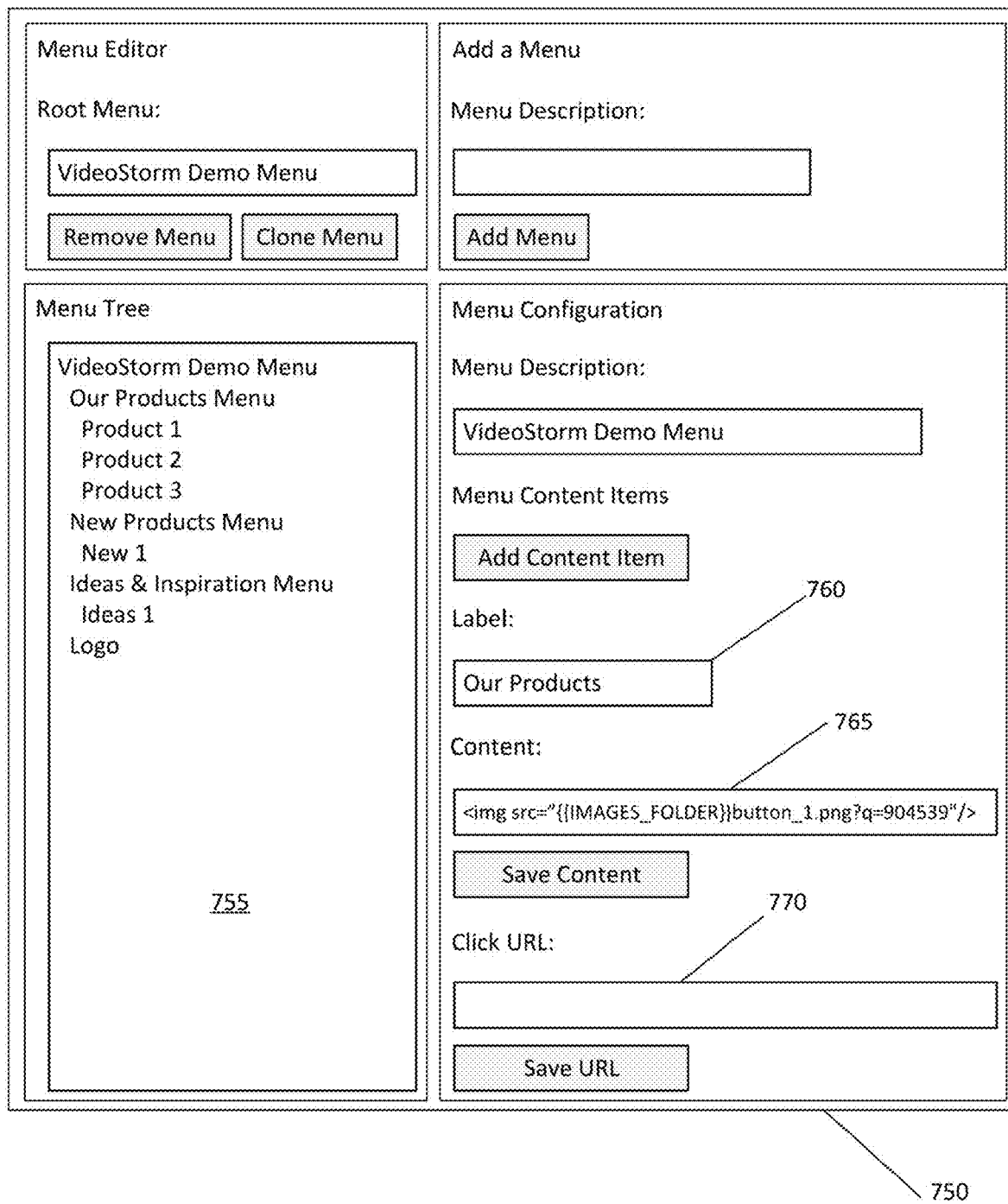

FIGS. 7A and 7B depict a user interface for defining interactive menus to be associated with a given video.

A user interface 700 can be used to create new video campaigns, whether from scratch or by using a cloning tool 705 on an existing campaign.

After selecting a particular video to edit, a popup window 750 allows the creation of a menu tree 755 having multiple layers (to populate both a primary menu 105 and a submenu 115, as well as potentially a tertiary menu or other hierarchical structures). Each option on the menu tree can be associated with a further submenu, and each menu or submenu item can be provided with a textual label 760, content 765 such as an image or even potentially a video or other interactive content within that portion of the menu, and a URL 770 that hyperlinks the option and will take the recipient to a different webpage if they click it.

The user interface also allows the video to be associated with a tracking pixel that will be generated when the JavaScript or other scripting language is executed on the browser to create the menu. This allows for limited tracking of recipient engagement to occur in parallel with the primary engagement via the menu; even if the recipient never clicks the menu, by loading an image from the management server 215 or the content server 220, the communicator is notified that the video has been loaded. The use of tracking pixels also allows a third party to be notified that a recipient has been showed the video.

Upon clicking a publish button 710, the JavaScript or other scripting language necessary to generate the interactive menu will be automatically created and stored on either the management server 215 or the content server 220. The VPAID or other definition for the video will also be generated and distributed to the web server 210 to be included with the webpages distributed by that server. Other features of the interface may include previewing a live rendering of the video during editing, generating a demo page for client review and/or demo purposes outside of a live campaign, and adding tracking assets other than tracking pixels, such as scripts for analytics or other purposes.

Figure 8:
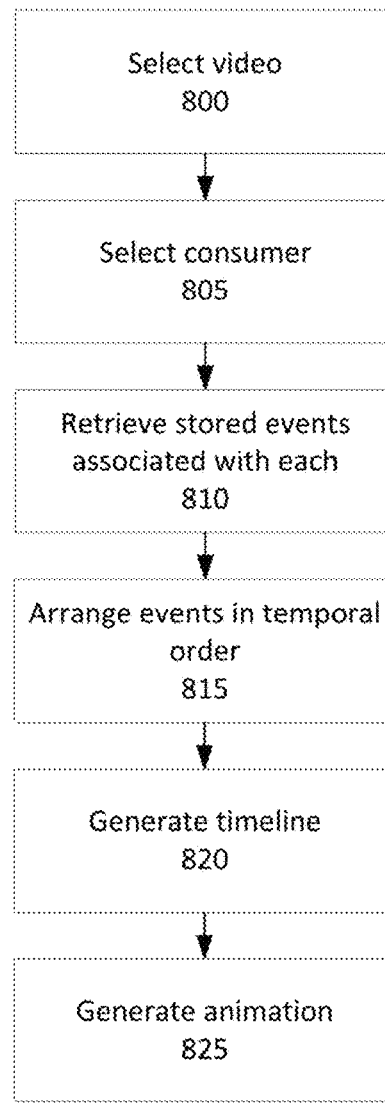
FIG. 8 depicts a method for reviewing and recreating a recipient's engagement experience with the video content.

FIG. 8 depicts a method for reviewing and recreating a recipient's engagement experience.

When a communicator wants to review recipients' experience with a particular video, a user interface may be provided to browse, first based on selection of a video (Step 800) and then upon selection of a particular recipient from a set of recipients who have viewed that video (Step 805), those interactions. After retrieving from the storage of all recipient events received all events that are at the intersection of that recipient and that video (Step 810), the events can be temporally ordered (Step 815) to establish a log of the recipient's experience.

This log may be visually structured in two ways to facilitate comprehension. In one visualization, a timeline may be created (Step 820) to show lengths of time spent watching the video and at what points of the video the recipient began to interact with the menu or other user interface elements. For example, a communicator may be able to see that the recipient viewed the video for 7 seconds before clicking on a menu item and opening a submenu, then only paused for 1 second before clicking a particular item of that submenu, showing a particular interest in that one item based on the lack of hesitation of engagement once that item was visible to the recipient. Having only the data that the recipient clicked that item 8 seconds after the video began is not nearly as valuable in demonstrating the recipient's interest.

In some embodiments, the log data may be used to generate an animation recreating the recipient's experience almost exactly (Step 825). For example, the video could begin playing for the communicator with a cursor representing the recipient's own cursor visible on the screen. At the exact moments in the video playback that the recipient interacted with a user interface element, the displayed cursor can be moved to the same element and the user interface in the animation updated to show the user interface as that recipient saw it at that moment. This information may be invaluable for getting a gut feeling as to how recipients are interacting with the video, as well as helping to troubleshoot any unforeseen problems with interaction between a video and the user interface, such as a selected color scheme of the user interface being difficult to see or illegible when the underlying video uses similar coloring in the same region at the same moment the user interface is being displayed.

Figure 9:
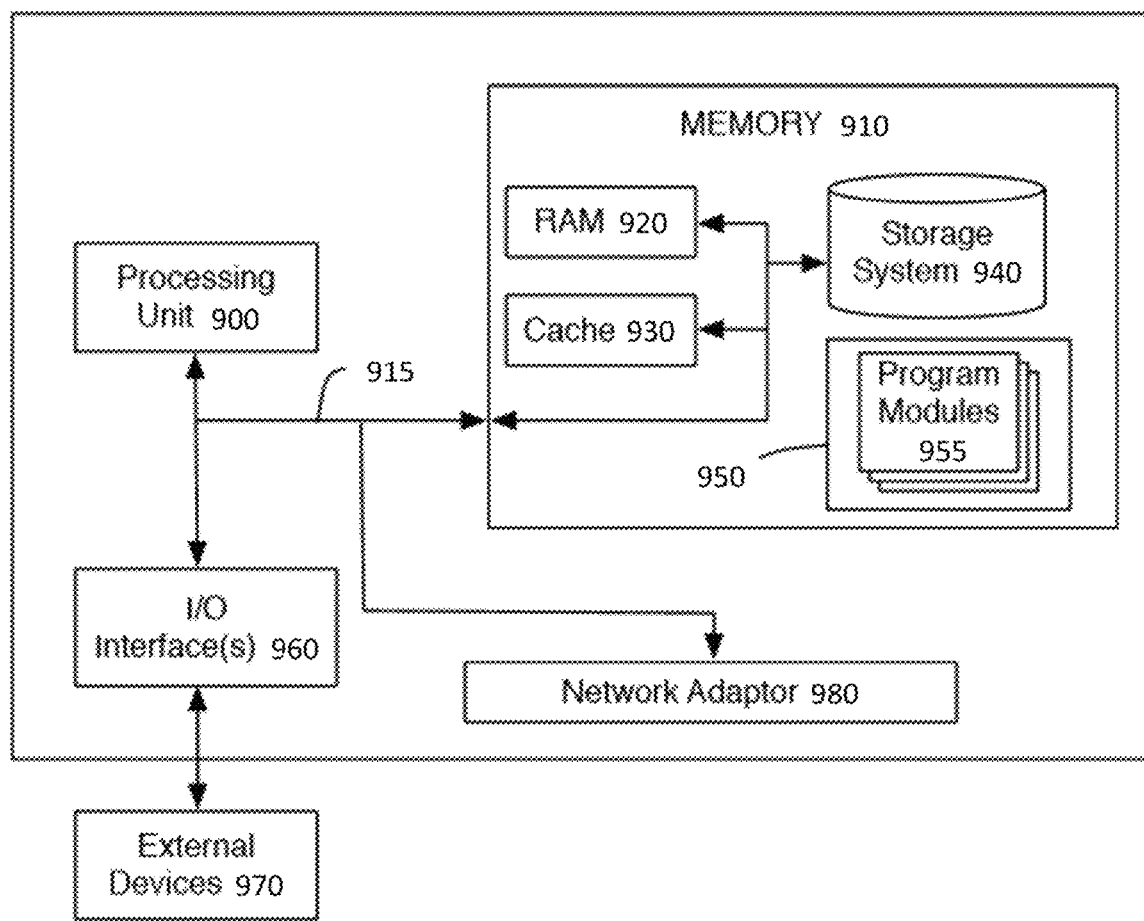
FIG. 9 is a high-level block diagram of a representative computing device that may be utilized to implement various features and processes described herein.

Although FIG. 2 depicts a preferred configuration of computing devices to accomplish the software-implemented methods described above, those methods do not inherently rely on the use of any particular specialized computing devices, as opposed to standard desktop computers and/or web servers. For the purpose of illustrating possible such computing devices, FIG. 9 is a high-level block diagram of a representative computing device that may be utilized for each of the computing devices and/or systems to implement various features and processes described herein. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the components of the computing device may include (but are not limited to) one or more processors or processing units 500, a system memory 510, and a bus 515 that couples various system components including memory 510 to processor 500.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 500 may execute computer programs stored in memory 510. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 500 may be used.

The computing device typically includes a variety of computer system readable media. Such media may be any available media that is accessible by the computing device, and it includes both volatile and non-volatile media, removable and non-removable media.

System memory 510 can include computer system readable media in the form of volatile memory, such as random access memory (RAM) 520 and/or cache memory 530. The computing device may further include other removable/non-removable, volatile/non-volatile computer system storage media. By way of example only, storage system 540 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 510 may include at least one program product having a set (e.g., at least one) of program modules that are configured to carry out the functions of embodiments described in this disclosure.

Program/utility 550, having a set (at least one) of program modules 555, may be stored in memory 510 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 570 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 560.

In addition, as described above, the computing device can communicate with one or more networks, such as a local area network (LAN), a general wide area network (WAN) and/or a public network (e.g., the Internet) via network adaptor 580. As depicted, network adaptor 580 communicates with other components of the computing device via bus 515. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for augmenting video media to add interactive functionality when displayed on a webpage within a web browser, comprising:
   one or more processors,
   non-transitory memory comprising instructions that, when executed by the one or more processors, cause the one or more processors to:
      generate a structured media definition file that instructs a video player within the web browser to display a video;
      include an element in the structured media definition file to cause the video player to execute a first script, such that execution of the first script instantiates one or more new HTML, elements within the webpage when the video is played, the one or more new HTML, elements comprising a second script that includes instructions to the web browser to generate an interactive menu, such that selection of an option from the interactive menu will call one or more functions of an application programming interface (API) via the second script;
      cause the structured media definition file to be transmitted to the web browser for interpretation by the video player, thereby causing the video player to begin playing the video and to execute the first script;
      receive one or more API calls made via the second script as it is executed by the web browser based on an individual's interaction with the interactive menu; and
      transmit one or more responses to the one or more API calls to the web browser, such that the second script receives the one or more responses and additional instructions of the second script are executed after receiving the one or more responses.

2. The system of claim 1, wherein the one or more new HTML, elements include a form for entry of information and transmission of that information via the API.

3. The system of claim 1, wherein the one or more new HTML elements include an interface for real-time electronic communication with other individuals.

4. The system of claim 1, wherein the one or more new HTML elements include an interface for posting content to a social networking website.

5. The system of claim 1, wherein the instructions, when executed by the one or more processors, further cause the one or more processors to:
   receive data from a third party indicating demographic, location, or other identifying information related to the individual; and
   including within the one or more responses to the one or more API calls instructions to dynamically update the interactive menu to include one or more new options based on the data received from the third party.

6. The system of claim 1, wherein the interactive menu is a first interactive menu if it is determined that the individual had not interacted with the interactive menu or the video during a previous instance of the video being displayed to the individual, and wherein the interactive menu is a second interactive menu different from the first interactive menu if it is determined that the individual did interact with the interactive menu or the video during a previous instance of the video being displayed to the individual.

7. The system of claim 6, wherein the second interactive menu already indicates selection of an option that is unselected in the first interactive menu, and wherein the individual had selected the option during the interaction during the previous instance of the video being displayed to the individual.

8. The system of claim 1, wherein the interactive menu is a multi-leveled, hierarchical menu that presents different visual options in a secondary menu each time the individual selects a different option from a primary menu.

9. The system of claim 1, wherein the structured media definition file is in a format that complies with the Video Player Advertisement-Serving Interface Definition (VPAID) and the first and second scripts are written in JavaScript.

10. The system of claim 1, wherein the one or more new HTML elements include an iFrame, wherein the iFrame contains the second script and the interactive menu, and wherein the iFrame shields operations of the second script and the interactive menu from interference by any scripting or name collision in the webpage, but the iFrame does not contain the first script or shield operations of the first script.

11. A computer-implemented method of augmenting video media to add interactive functionality when displayed on a webpage within a web browser, comprising:
   generating a structured media definition file that instructs a video player within the web browser to display a video;
   including an element in the structured media definition file to cause the video player to execute a first script, such that execution of the first script instantiates one or more new HTML elements within the webpage when the video is played, the one or more new HTML elements comprising a second script that includes instructions to the web browser to generate an interactive menu, such that selection of an option from the interactive menu will call one or more functions of an application programming interface (API) via the second script;

causing the structured media definition file to be transmitted to the web browser for interpretation by the video player, thereby causing the video player to begin playing the video and to execute the first script;

receiving one or more API calls made via the second script as it is executed by the web browser based on an individual's interaction with the interactive menu; and transmitting one or more responses to the one or more API calls to the web browser, such that the second script receives the one or more responses and additional instructions of the second script are executed after receiving the one or more responses.

12. The method of claim 11, wherein the one or more new HTML, elements include a form for entry of information and transmission of that information via the API.

13. The method of claim 11, wherein the one or more new HTML elements include an interface for real-time electronic communication with other individuals.

14. The method of claim 11, wherein the one or more new HTML elements include an interface for posting content to a social networking website.

15. The method of claim 11, wherein the instructions, when executed by the one or more processors, further cause the one or more processors to:

receive data from a third party indicating demographic, location, or other identifying information related to the individual; and including within the one or more responses to the one or more API calls instructions to dynamically update the interactive menu to include one or more new options based on the data received from the third party.

16. The method of claim 11, wherein the interactive menu is a first interactive menu if it is determined that the individual had not interacted with the interactive menu or the video during a previous instance of the video being displayed to the individual, and wherein the interactive menu is a second interactive menu different from the first interactive menu if it is determined that the individual did interact with the interactive menu or the video during a previous instance of the video being displayed to the individual.

17. The method of claim 16, wherein the second interactive menu already indicates selection of an option that is unselected in the first interactive menu, and wherein the individual had selected the option during the interaction during the previous instance of the video being displayed to the individual.

18. The method of claim 11, wherein the interactive menu is a multi-leveled, hierarchical menu that presents different visual options in a secondary menu each time the individual selects a different option from a primary menu.

19. The method of claim 11, wherein the structured media definition file is in a format that complies with the Video Player Advertisement-Serving Interface Definition (VPAID) and the first and second scripts are written in JavaScript.

20. The method of claim 11, wherein the one or more new HTML elements include an iFrame, wherein the iFrame contains the second script and the interactive menu, and wherein the iFrame shields operations of the second script and the interactive menu from interference by any scripting or name collision in the webpage, but the iFrame does not contain the first script or shield operations of the first script.

* * * * *